US012724587B2

(12) United States Patent
Zeng et al.

(10) Patent No.: US 12,724,587 B2
(45) Date of Patent: Sep. 1, 2026

(54) PARALLEL FINITE FIELD MULTIPLICATION DEVICE

(71) Applicant: SHENZHEN PANGO MICROSYSTEMS CO., LTD., Shenzhen City (CN)

(72) Inventors: Zhiming Zeng, Shenzhen City (CN); Xuelei Xuan, Shenzhen City (CN)

(73) Assignee: SHENZHEN PANGO MICROSYSTEMS CO., LTD. (CN)

( * ) Notice: Subject to any disclaimer, the term of this patent is extended or adjusted under 35 U.S.C. 154(b) by 1015 days.

(21) Appl. No.: 17/906,985

(22) PCT Filed: Mar. 24, 2021

(86) PCT No.: PCT/CN2021/082552
§ 371 (c)(1),
(2) Date: Sep. 22, 2022

(87) PCT Pub. No.: WO2022/121149
PCT Pub. Date: Jun. 16, 2022

(65) Prior Publication Data
US 2023/0118570 A1 Apr. 20, 2023

(30) Foreign Application Priority Data
Dec. 10, 2020 (CN) ........................ 202011457153.0

(51) Int. Cl.
*G06F 7/523* (2006.01)
*G06F 7/72* (2006.01)

(52) U.S. Cl.
CPC ............. *G06F 7/523* (2013.01); *G06F 7/724* (2013.01)

(58) Field of Classification Search
CPC ................................ G06F 7/523; G06F 7/774
See application file for complete search history.

(56) References Cited

U.S. PATENT DOCUMENTS 5,943,250 A * 8/1999 Kim ...................... G06F 7/5338 708/708
6,035,317 A * 3/2000 Guy ........................ G06F 7/728 708/492

(Continued)

FOREIGN PATENT DOCUMENTS

CN 1658200 A 8/2005
CN 106201433 A 12/2016

OTHER PUBLICATIONS

Meher et al; "An optimized design for serial-parallel finite field multiplication over GF(2m) based on all-one polynomials" 2009 Asia and South Pacific Design Automation Conference; pp. 210-215 (Year: 2009).*

*Primary Examiner* — Michael D. Yaary

(57) ABSTRACT

A parallel finite field multiplication device is disclosed. The device comprises M cascaded logic processing modules, each of which comprises four input ends and two output ends for carrying out different finite multiplication in different length. The device is calculated step by step through M cascaded logic processing modules according to the number of cascaded logic processing modules. In this device, M cascaded logic processing modules may be used, according to different numbers of the cascaded logic processing modules, in finite field multiplication of different lengths, without needing to carry out polynomial multiplication.

5 Claims, 5 Drawing Sheets

(56) References Cited

U.S. PATENT DOCUMENTS

| | | | | |
|---|---|---|---|---|
| 6,760,742 | B1 * | 7/2004 | Hoyle | G06F 7/724 708/492 |
| 2003/0135530 | A1 * | 7/2003 | Parthasarathy | G06F 7/724 708/492 |
| 2011/0246548 | A1 * | 10/2011 | Yen | G06F 7/724 708/492 |

* cited by examiner

PARALLEL FINITE FIELD MULTIPLICATION DEVICE

FIELD OF THE INVENTION

This invention relates to the technical field of integrated circuit chips, in particular to a parallel finite field multiplication device.

BACKGROUND

A standard m-bit finite field multiplication is expressed as, the m-bit multiplicand $A([a_{m-1}a_{m-2} \ldots a_1a_0])$ is multiplied by the m-bit multiplier $B([b_{m-1}b_{m-2} \ldots b_1b_0])$, then, the primitive polynomial $p=p_mx^m+p_{m-1}x^{m-1}+ \ldots +p_1x^1+p_0$ is complemented $C=(A \cdot B)\bmod(p)$ to obtain $C=[c_{m-1}c_{m-2} \ldots c_1c_0]$, which is also m-bit data.

The look-up table method adopts a rom with an input of 2m-bit and an output of tri-bit, Store all possible multiplication results in rom; read the input address of rom, that is, the combination of multiplicand and multiplier, there are $m^2$ kinds of combined inputs in total.

Chinese publication CN106201433A discloses a finite field multiplier based on RS code, which is composed of two parts: step 1, calculate A*B to obtain a 2m−1 polynomial, step 2, perform the remainder operation according to the result of step 1 to obtain C. The method of this multiplier is more intuitive, but it needs polynomial multiplication (convolution operation) and remainder operation.

Chinese publication CN1658200A discloses a finite field multiplier based on FPGA, the finite field multiplier based on matrix form is adopted, and the optimized multiplier is obtained after the previous matrix processing; however, the pre-processing process is complex, and once the length of the finite field changes, the matrix needs to be reprocessed and optimized.

SUMMARY

An object of the invention is to provide a parallel finite field multiplication device without polynomial multiplication and storage space.

In order to achieve the above object, the invention provides a parallel finite field multiplication device comprising M cascaded logic processing modules, and each logic processing module includes four input ends and two output ends,

- a first input end of a first logic processing module receives a first operand;
- a second input end of the first logic processing module receives a zero value;
- a third input end of the first logic processing module receives a 0th bit of a second operand;
- a first input end of the mth logic processing module is connected to a first output end of an m−1th logic processing module;
- a second input end of the mth logic processing module is connected to a second output end of the m−1th logic processing module;
- a third input end of the mth logic processing module receives an m−1th bit of the second operand; and
- a fourth input end of each logic processing module forms a parallel connection together and receives a third operand;
- wherein, M is an integer greater than 1, m is an integer greater than 1 and less than or equal to M.

Preferably, the first operand is an M-bit multiplicand, and the second operand is an M-bit multiplier.

Preferably, the third operand is a primitive polynomial.

Preferably, the logic processing module comprises a shifter, a first XOR gate, a second XOR gate, a first selector and a second selector;

- an input end of the shifter is connected to the first input end of the logic processing module; an output end of the shifter is connected to a first input end of the first XOR gate, a first input end of the first selector and a control end of the first selector respectively;
- a second input end of the first XOR gate is connected to the fourth input end of the logic processing module, and an output end of the first XOR gate is connected to a second input end of the first selector;
- an output end of the first selector is connected to a first input end of the second XOR gate and the first output end of the logic processing module respectively;
- a second input end of the second XOR gate is connected to the second input end of the logic processing module; an output end of the second XOR gate is connected to a first input end of the second selector;
- a second input end of the second selector is connected to the second input end of the logic processing module; a control end of the second selector is connected to the third input end of the logic processing module; an output end of the second selector is connected to the second output of the logic processing module.

Preferably, the second output of the mth logic processing module outputs the operation result of the parallel finite field multiplication device.

The beneficial effects of the invention are to provide a parallel finite field multiplication device which is calculated step by step through M cascaded logic processing modules according to the number of cascaded logic processing modules so that the device can be used for finite field multiplication of different lengths without polynomial multiplication and storage space.

DETAILED DESCRIPTION OF THE INVENTION

In order to make the purpose, technical solution and advantages of this specification clearer, the technical solution of this specification will be clearly and completely described in combination with the specific implementation examples and the corresponding appended drawings. Obviously, the described implementation is only part of this specification, not all of it. Based on the embodiments in this specification, all other embodiments obtained by ordinary technicians in the art without creative work should fall into the scope of protection of the invention. It should be noted that the embodiments and features in the embodiments in the present invention can be combined with each other without conflict.

The terms "first", "second" and "third" in the description, claims and the above drawings of the invention are used to distinguish different objects, rather than to describe a specific order. In addition, the term "includes" and any variations thereof are intended to cover non exclusive inclusion. For example, a process, method, system, product or equipment containing a series of steps or units is not limited to the listed steps or units, but optionally also includes the steps or units not listed, or optionally includes other steps or units fixed to these processes, methods, products or equipment.

The embodiment of the invention provides a parallel finite field multiplication device for m-bit finite field multiplication (finite field multiplier), the elements of its finite field are all in $GF(2^m)$, the primitive polynomial of the element generating the finite field is an irreducible polynomial $p=p_m x^m+p_{m-1}x^{m-1}+\ldots+p_1x^1+p_0$; wherein, $p_m$ and $p_0$ are 1. The multiplication operation in the finite field, that is, any two non-0 elements A and B in the finite field are multiplied to obtain element C, which are all elements in the finite field.

That is, $C=(A\cdot B)\mathrm{mod}(p)$, when the multiplicand and multiplier have 0, the multiplication output is always all 0.

Figure 1:
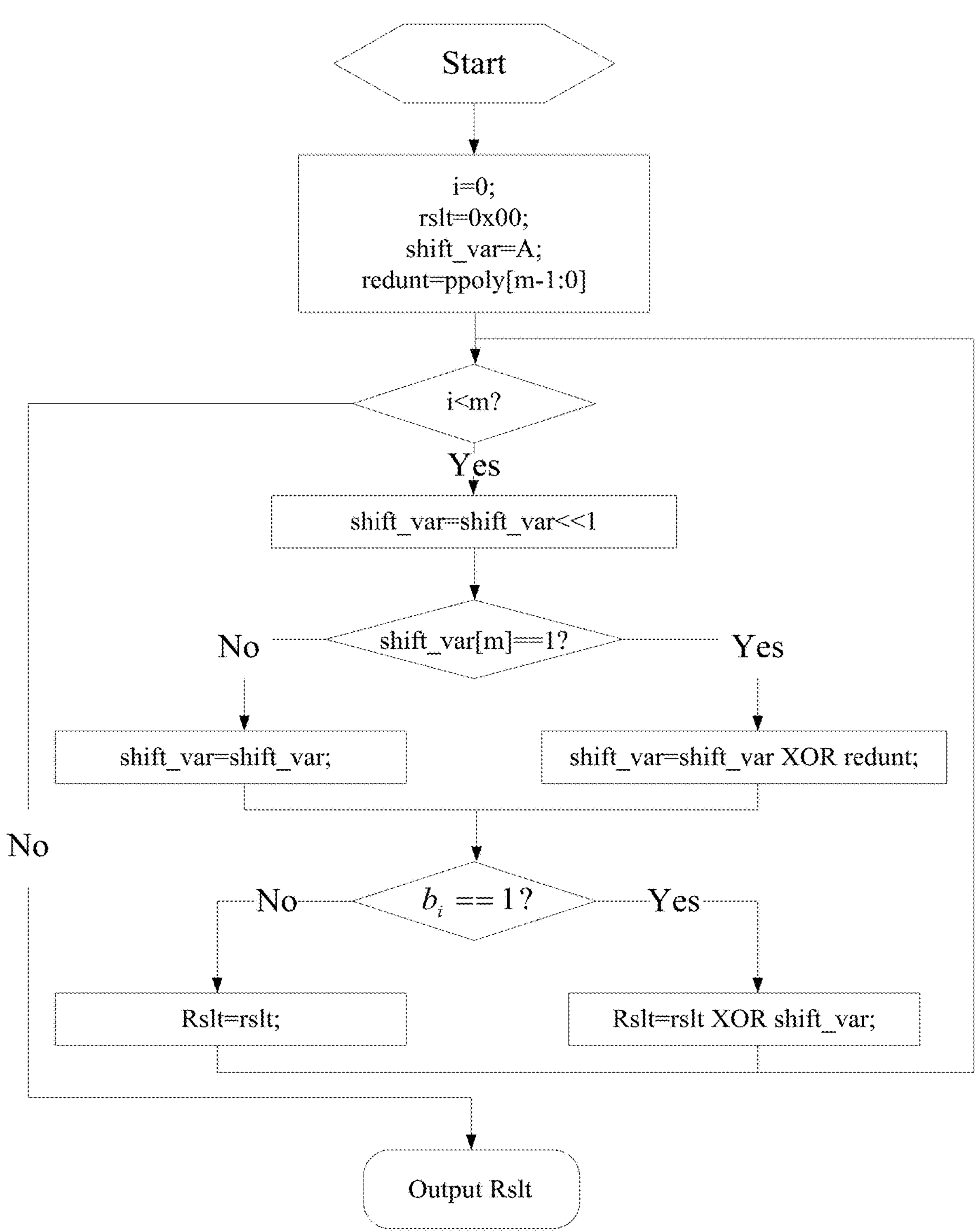
FIG. 1 is a flowchart of parallel finite field multiplication according to an embodiment of the invention.

When both the multiplicand and multiplier are non-zero, the multiplication process is as follows:

as shown in FIG. 1, step S1, start the multiplication of A and B, initialize the assignment; wherein, the number of assignment cycles variable i=0, the result rslt=0x00, shift left operation shift_var=A, remainder redunt (redundant)=ppoly[m−1; 0], ppoly [m−1; 0] is the result of finding the remainder of $x^m$ by generating primitive polynomial $p=p_m x^m+p_{m-1}x^{m-1}+\ldots+p_1x^1+p_0$ in finite field, that is $[p_{m-1}, p_{m-2}, p_{m-3}, \ldots, p_1, p_0]$, the coefficients of the primitive polynomials generated by the finite field are known. A is one of the two multipliers of the finite field multiplier; A*B=C, C is the result, A/B is the multiplier, specifically, A is the multiplicand and B is the multiplier.

Step S2, judge whether the number of cycles m is greater than the number of cycles variable i, if so, execute step S3, otherwise output the multiplication result Rslt; among them, the finite field multiplication is the multiplication of two multipliers of m-bit, that is, it takes m cycles to get the result.

Step S3, shift left operation shift_var=shift_var<<1, that is, shift left by one bit.

Step S4, Judge whether the left shift operation shift_var [m]=1, that is, whether the m+1th bit after the left shift operation is 1, if so, execute step S51, otherwise execute step S52;

Step S51, the left shift operation shift_var=shift_var XOR redunt, that is, the left shift operation shift_var and redunt XOR, and execute step S6;

Step S52, the left shift operation shift_var=shift_var, that is, keep the left shift operation shift_var unchanged, and execute step S6;

Step S6, judge whether $b_i$==1, that is, whether the Ith bit of multiplier B is 1, if so, execute step S61, otherwise execute step S62;

Step S61, the result Rslt=rslt, that is, take the current result rslt as the multiplication result Rslt (the multiplication result Rslt remains the original value), and repeat step S2;

Step S62, the result Rslt=rslt XOR shift_var, that is, take the XOR of the current result rslt and the shift left operation shift_var as the multiplication result Rslt, and repeat step S2.

The above process is the multiplication result rslt after m cycles, that is, the lower m bit are the result of A and B multiplication.

The parallel finite field multiplication device includes M cascaded logic processing modules, and each logic processing module includes four input ends and two output ends.

A first input end of a first logic processing module receives a first operand; a second input end of the first logic processing module receives a zero value; a third input end of the first logic processing module receives a 0th bit of a second operand; a first input end of the mth logic processing module is connected to a first output end of an m−1th logic processing module; ta second input end of the mth logic processing module is connected to a second output end of the m−1th logic processing module; a third input end of the mth logic processing module receives an m−1th bit of the second operand; a fourth input end of each logic processing module forms a parallel connection together and receives a third operand; wherein, M is an integer greater than 1, m is an integer greater than 1 and less than or equal to M.

The parallel finite field multiplication device of the invention, calculates step by step through M cascaded logic processing modules, according to the number of cascaded logic processing modules, it can be used for finite field multiplication of different lengths without polynomial multiplication and storage space.

Figure 2:
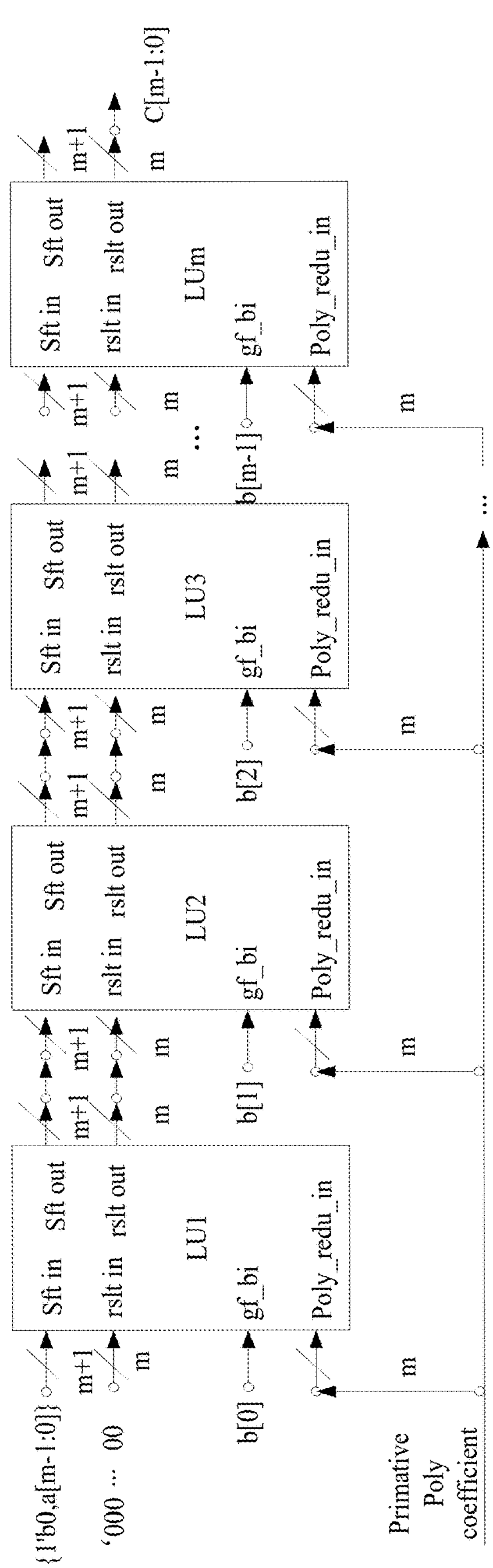
FIG. 2 is a structural diagram of m-bit finite field multiplication according to an embodiment of the invention.

As shown in FIG. 2, the parallel finite field multiplication device includes M cascaded logic processing modules, and each logic processing module includes four input ends and two output ends.

The four input ends include the first input end sft_n, the second input end rslt_in, the third input end gf_bi and the fourth input end poly_redu_in; the two output ends include the first output end sft_out and the second output end rslt_out.

The first input end sft_in of the first logic processing module LU1 receives a first operand; the second input end rslt_in of the first logic processing module LU1 receives a zero value; the third input end gf_bi of the first logic processing module LU1 receives the 0th bit of a second operand; the fourth input end poly_redu_in of the first logic processing module LU1 receives a third operand.

The first input end of the second logic processing module LU2 is connected to the first output end of the first logic processing module LU1; the second input end of the second logic processing module LU2 is connected to the second output end of the first logic processing module LU1; the third input end gf_bi of the second logic processing module LU2 receives the first bit of the second operand; the fourth input end poly_redu_in of the second logic processing module LU2 receives the third operand.

The first input end of the third logic processing module LU3 is connected to the first input end of the second logic processing module LU2; the second input end of the third logic processing module LU3 is connected to the second output end of the second logic processing module LU2; the third input end gf_bi of the third logic processing module LU3 receives the second bit of the second operand; the fourth input end poly_redu_in of the third logic processing module LU3 receives the third operand.

By analogy, the first input end of the mth logic processing module LUm is connected to the first output end of the m−1th logic processing module Lum−1; the second input end of the mth logic processing module LUm is connected to the second output end of the m−1th logic processing module Lum−1; the third input end gf_bi of the mth logic processing module LUm receives the m−1th bit of the second operand; the fourth input end poly_redu_in of the mth logic processing module LUm receives the third operand.

As described above, the fourth input end poly_redu_in of the first logic processing module LU1, the fourth input end poly_redu_in of the second logic processing module LU2, the fourth input end poly_redu_in of the third logic processing module LU3, . . . , and the fourth input end poly_redu_in of the mth logic processing module LUm are all connected in parallel and receive the third operand.

M is an integer greater than 1, m is an integer greater than 1 and less than or equal to M.

In one embodiment, the first operand is an M-bit multiplicand A, and the second operand is an M-bit multiplier B.

Preferably, the third operand is an primitive polynomial $[p_{m-1}, p_{m-2}, p_{m-3}, \ldots, p_1, p_0]$.

Preferably, the first input end sft_in: sftin[m:0] is used to receive the shift data obtained from the previous stage of the variable, and the received data of the first stage is the multiplicand A;

- the second input end rslt_in: rslt_in[m−1:0] is used to receive the multiplication result obtained from the previous stage, and the received data of the first stage is all 0;
- the third input end gf_bi is used to receive a bit value of multiplier B, the first stage represents bit0(*b*[0]) of multiplier B, the second stage represents bit1(*b*[1]) of multiplier B, the third stage represents bit2(*b*[2]) of multiplier B, and so on until b[m−1];
- the fourth input end poly_redu_in: polyredu_in[m−1:0] is used to receive the third operand, which is the coefficient $[p_{m-1}, p_{m-2}, p_{m-3}, \ldots, p_1, p_0]$ of the original polynomial, with a total of m-bit, and all logic processing modules have the same coefficient value.

The first output end sft_out: sftout[m:0] outputs shift data sft_out;

- the second output end rstl_out: rsltout[m−1:0] outputs the multiplication result rstlout of this stage, and the last stage outputs the multiplication result C, that is, the operation result of the parallel finite field multiplication device.

In one embodiment, each logic processing module includes a shifter, a first XOR gate, a second XOR gate, a first selector and a second selector.

Figure 3:
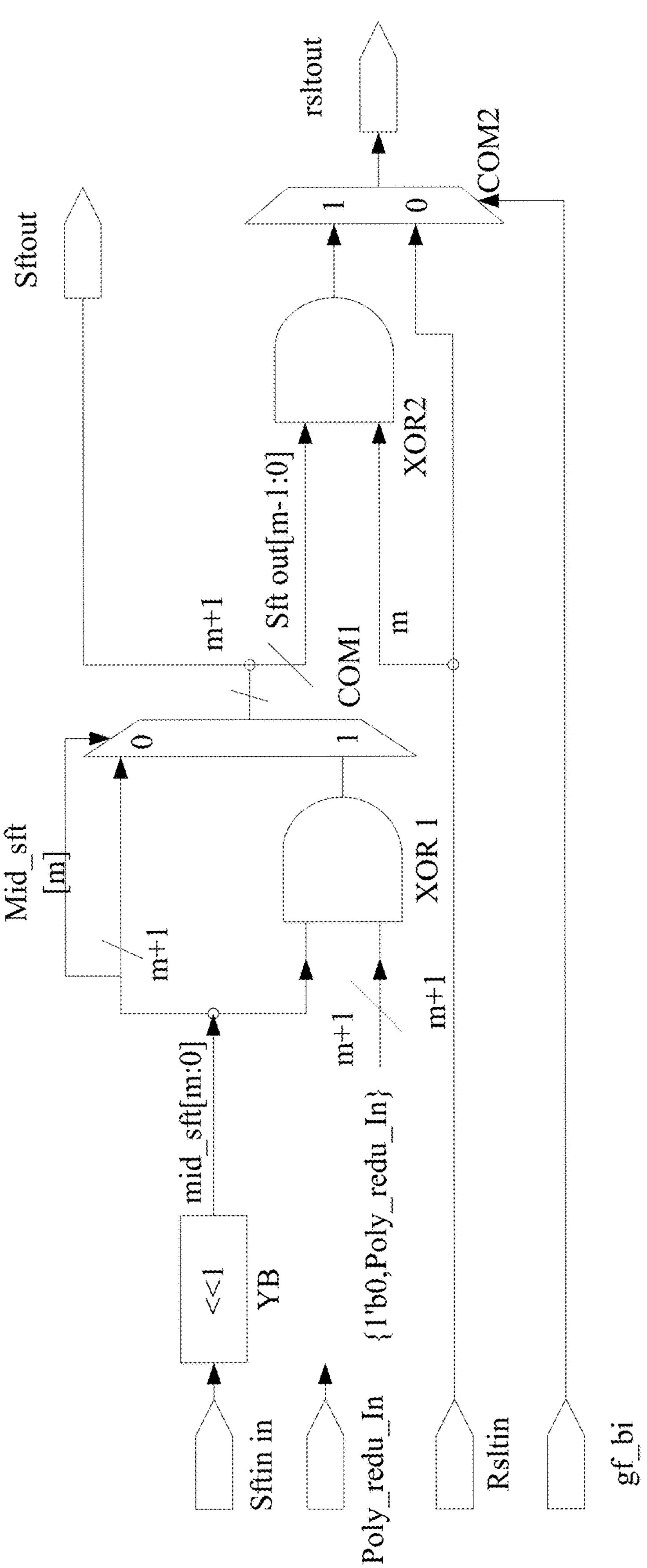
FIG. 3 is a structural diagram of the m-bit logic processing module according to an embodiment of the invention.

As shown in FIG. 3, the input end of the shifter YB is connected to the first input end stl_in of the logic processing module; the output end of the shifter YB is connected to the first input end of the first XOR gate XOR1, the first input end of the first selector COM1 and the control end of the first selector COM1 respectively; the second input end of the first XOR gate XOR1 is connected to the fourth input end poly_redu_in of the logic processing module, and the output end of the first XOR gate XOR1 is connected to the second input end of the first selector COM1; the output end of the first selector COM1 is connected to the first input end of the second XOR gate XOR2 and the first output end sft_out of the logic processing module; the second input end of the second XOR gate XOR2 is connected to the second input end rslt_in of the logic processing module; the output end of the second XOR gate XOR2 is connected to the first input end of the second selector COM2; the second input end of the second selector COM2 is connected to the second input end rslt_in of the logic processing module; the control end of the second selector COM2 is connected to the third input end gf_bi of the logic processing module; the output end of the second selector COM2 is connected to the second output end rslt_out of the logic processing module.

The first input end of the first XOR gate XOR1 is the “0” input end, the second input end of the first XOR gate is the “1” input end, the first input end of the second XOR gate XOR2 is the “1” input end, and the second input end of the second XOR gate XOR2 is the “0” input end.

The shifter YB is used to realize the left shift operation shift_var=shift_var<<1, that is, sftin[m−1:0] to shift one bit left Mid_sft[m:0]. The first XOR gate XOR1 and the first selector COM1 are used to judge the left shift operation shift_var[m]=1, that is, whether the m+1th bit after the left shift operation is 1, due to the XOR operation with Mid_sft [m:0], it needs to be extended to the m+1 bit, the expansion mode is to add a bit 0 in the m+1th bit; when it is 1, the left shift operation shift_var and redunt to XOR; when it is 0, the left shift operation shift_var remains unchanged.

The second selector COM2 is used to judge $b_i$==1, that is, whether the Ith bit of multiplier B is 1, if it is 1, the XOR of current result rslt and shift left operation shift_var is taken as multiplication result Rslt, XOR the low in bit of sft_out [m:0], i.e. sft_out[m−1:0] and rslt_in[m−1:0], taking the lower m bit is equivalent to the operation of taking the remainder of item x^m of the polynomial to ensure that the remainder of each stage will not exceed m-bit otherwise the multiplication result Rslt remains unchanged.

Figure 4:
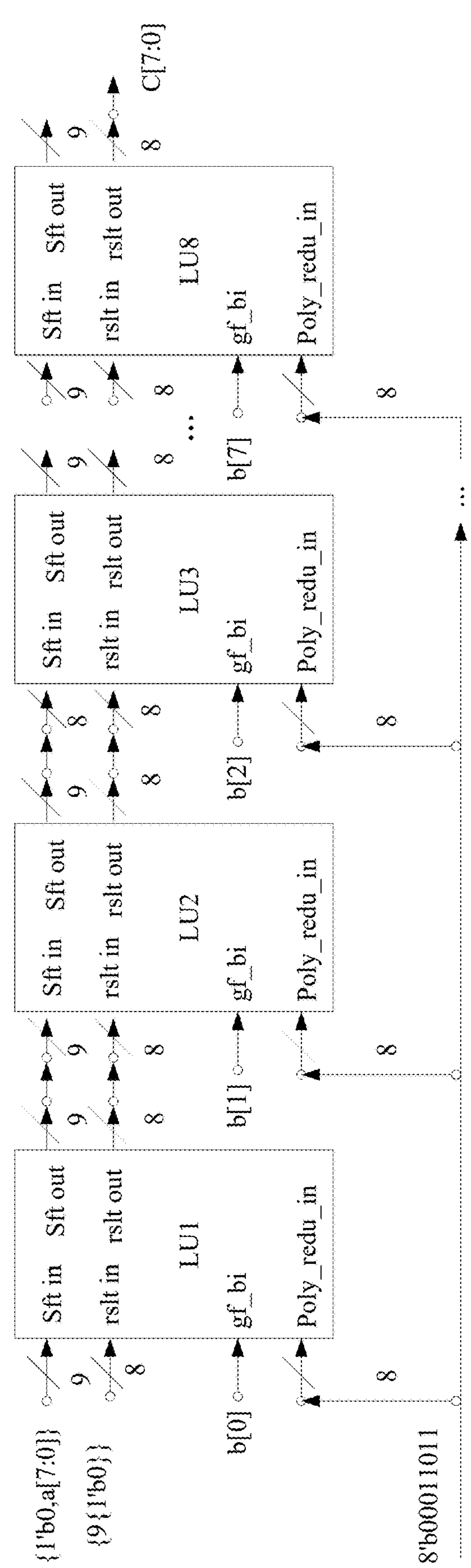
FIG. 4 is a structural diagram of 8-bit finite field multiplication according to an embodiment of the invention.

In one embodiment, as shown in FIG. 4, it is an 8-bit parallel finite field multiplication device, comprising 8 cascaded logic processing modules, and each logic processing module includes four input ends and two output ends.

The four input ends include the first input end sft_in, the second input end rslt_in, the third input end gf_bi and the fourth input end poly_redu_in; the two output end include the first output end sft_out and the second output end rslt_out.

The first input ends sft_in of the first logic processing module LU1 receives a first operand; the second input end rslt_in of the first logic processing module LU1 receives a zero value; the third input end gf_bi of the first logic processing module LU1 receives the 0th bit of a second operand; the fourth input end poly_redu_in of the first logic processing module LU1 receives a third operand.

The first input end of the second logic processing module LU2 is connected to the first output end of the first logic processing module LU1; the second input end of the second logic processing module LU2 is connected to the second output end of the first logic processing module LU1; the third input end gf_bi of the second logic processing module LU2 receives the first bit of the second operand; the fourth input end poly_redu_in of the second logic processing module LU2 receives the third operand.

The first input end of the third logic processing module LU3 is connected to the first input end of the second logic processing module LU2; the second input end of the third logic processing module LU3 is connected to the second output end of the second logic processing module LU2; the third input end gf_bi of the third logic processing module LU3 receives the second bit of the second operand; the fourth input end poly_redu_in of the third logic processing module LU3 receives the third operand.

By analogy, the first input end of the eighth logic processing module LU8 is connected to the first output end of the seventh logic processing module Lu7; the second input end of the eighth logic processing module LU8 is connected to the second output end of the seventh logic processing module Lu7; the third input end gf_bi of the eighth logic processing module LU8 receives the seventh bit of the second operand; the fourth input end poly_redu_in of the eighth logic processing module LU8 receives the third operand.

The first operand is an M-bit multiplicand A[7:0], and the second operand is an M-bit multiplier B.

The third operand is an primitive polynomial $[p_{m-1}, p_{m-2}, p_{m-3}, \ldots, p_1, p_0]$=[00011011].

Preferably, the first input end sft_in: is used to receive the shift data obtained from the previous stage of the variable, and the received data of the first stage is the multiplicand {1'b0,*a*[7:0]};

the second input end rslt_in: is used to receive the multiplication result obtained from the previous stage, and the received data of the first stage is all 0, i.e. {9{1'b0}};

the third input end gf_bi is used to receive a bit value of multiplier B, the first stage represents bit0(*b*[0]) of multiplier B, the second stage represents bit1(*b*[1]) of multiplier B, the third stage represents bit2(*b*[2]) of multiplier B, and so on until b[7];

the fourth input end poly_redu_in: is used to receive the third operand, which is the coefficient $[p_{m-1}, p_{m-2}, p_{m-3}, \ldots, p_1, p_0]$ of the original polynomial, with a total of m-bit, and all logic processing modules have the same coefficient value of 8'b00011011.

The first output end sft_out: sftout[m:0] outputs shift data sft_out;

the second output end rstl_out: rsltout[m−1:0] outputs the multiplication result rstlout of this stage, and the last stage outputs the multiplication result C[7:0], that is, the operation result of the parallel finite field multiplication device.

Figure 5:
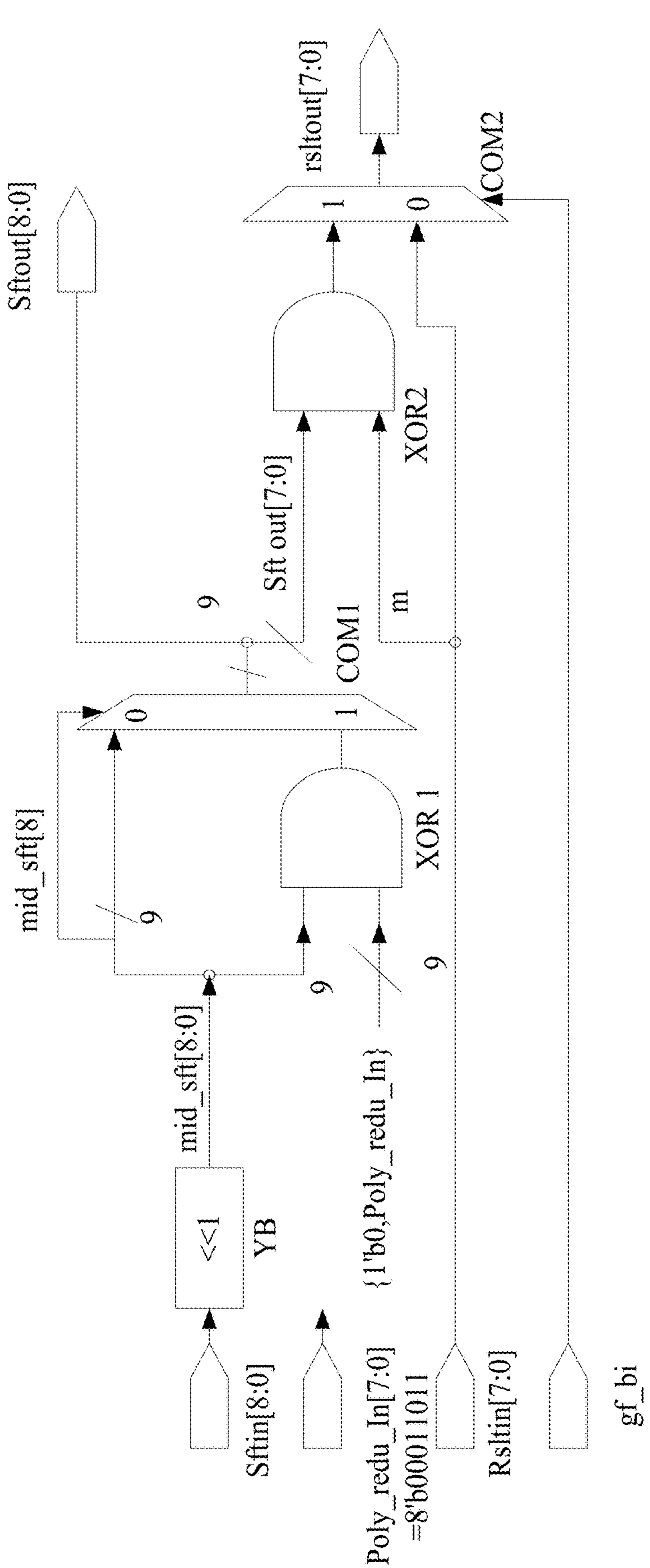
FIG. 5 is a structural diagram of an 8-bit logic processing module according to an embodiment of the invention.

As shown in FIG. 5, the input end YB of the shifter is connected to the first input end sft_in of the logic processing module; the output end of the shifter YB is connected to the first input end of the first XOR gate XOR1, the first input end of the first selector COM1 and the control end of the first selector COM1 respectively; the second input end of the first XOR gate XOR1 is connected to the fourth input end poly_redu_in of the logic processing module, and the output end of the first XOR gate XOR1 is connected to the second input end of the first selector COM1; the output end of the first selector COM1 is connected to the first input end of the second XOR gate XOR2 and the first output end sft_out of the logic processing module; the second input end of the second XOR gate XOR2 is connected to the second input end rslt_in of the logic processing module; the output end of the second XOR gate XOR2 is connected to the first input end of the second selector COM2; the second input end of the second selector COM2 is connected to the second input end rslt_in of the logic processing module; the control end of the second selector COM2 is connected to the third input end gf_bi of the logic processing module; the output end of the second selector COM2 is connected to the second output end rslt_out of the logic processing module.

The shifter YB is used to realize the left shift operation shift_var=shift_var<<1, that is, sftin[7:0] to shift one bit left Mid_sft[8:0]. The first XOR gate XOR1 and the first selector COM1 are used to judge the left shift operation shift_var [8]=1, that is, whether the ninth bit after the left shift operation is 1, due to the XOR operation with Mid_sft[8:0], it needs to be extended to the 9 bit, the expansion mode is to add a bit 0 in the ninth bit; when it is 1, the left shift operation shift_var and redunt to XOR; when it is 0, the left shift operation shift_var remains unchanged.

The second selector COM2 is used to judge $b_i$==1, that is, whether the Ith bit of multiplier B is 1, if it is 1, the XOR of current result rslt and shift left operation shift_var is taken as multiplication result Rslt (XOR the low m bit of sft_out [8:0], i.e. sft_out[7:0] and rslt_in[7:0]), otherwise the multiplication result Rslt remains unchanged.

The parallel finite field multiplication device of the invention shifts the information of the input end sft_in[m−1:0] at the first input end through M cascaded logic processing modules, according to the shifted highest bit information, it is determined whether to XOR the shifted low m-bit information with the coefficients of the low m-bit of the finite field generated polynomial, the result is sft_out[m:0]. The Rslt_in information determines whether to XOR with the low m bit information of sft_out according to the value of gf_bi (the ith bit of the corresponding multiplier B) to obtain the result rslt_out. According to the number of cascaded logic processing modules, it can be used for finite field multiplication with different lengths without polynomial multiplication and storage space.

The above is only the embodiment of the invention. It should be pointed out herein that ordinary technicians in the art can make improvements without departing from the creative spirit of the invention, but these should fall into the protection scope of the invention.

What is claimed is:

1. A parallel finite field multiplication device, comprising M cascaded logic processing modules, each of which includes four input ends and two output ends, wherein a first input end of a first logic processing module receives a first operand;

a second input end of the first logic processing module receives a zero value;

a third input end of the first logic processing module receives a 0th bit of a second operand;

a first input end of the mth logic processing module is connected to a first output end of an m−1th logic processing module;

a second input end of the mth logic processing module is connected to a second output end of the m−1th logic processing module;

a third input end of the mth logic processing module receives an m−1th bit of the second operand; and a fourth input end of each logic processing module forms a parallel connection together and receives a third operand;

wherein M is an integer greater than 1, m is an integer greater than 1 and less than or equal to M.

2. The parallel finite field multiplication device according to claim 1, wherein the first operand is an M-bit multiplicand, and the second operand is an Mbit multiplier.

3. The parallel finite field multiplication device according to claim 1, wherein the third operand is a primitive polynomial.

4. The parallel finite field multiplication device according to claim 1, wherein the logic processing module comprises a shifter, a first XOR gate, a second XOR gate, a first selector and a second selector; and wherein an input end of the shifter is connected to the first input end of the logic processing module; an output end of the shifter is connected to a first input end of the first XOR gate, a first input end of the first selector and a control end of the first selector respectively;

a second input end of the first XOR gate is connected to the fourth input end of the logic processing module, and an output end of the first XOR gate is connected to a second input end of the first selector;

an output end of the first selector is connected to a first input end of the second XOR gate and the first output end of the logic processing module respectively;

a second input end of the second XOR gate is connected to the second input end of the logic processing module; an output end of the second XOR gate is connected to a first input end of the second selector; and a second input end of the second selector is connected to the second input end of the logic processing module; a control end of the second selector is connected to the third input end of the logic processing module; an output end of the second selector is connected to the second output end of the logic processing module.

5. The parallel finite field multiplication device according to claim 1, wherein the second output end of the mth logic processing module outputs the operation result of the parallel finite field multiplication device.

* * * * *